US010341341B2

(12) United States Patent
Fairbanks et al.

(10) Patent No.: US 10,341,341 B2
(45) Date of Patent: *Jul. 2, 2019

(54) RFID AUTHENTICATION ARCHITECTURE AND METHODS FOR RFID AUTHENTICATION

(71) Applicant: SMARTRAC TECHNOLOGY FLETCHER, INC., Fletcher, NC (US)

(72) Inventors: John Fairbanks, San Diego, CA (US); Douglas Moran, Carlsbad, CA (US); Jun Liu, San Diego, CA (US)

(73) Assignee: SMARTRAC TECHNOLOGY FLETCHER, INC., Fletcher, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,847

(22) Filed: Dec. 6, 2017

(65) Prior Publication Data

US 2018/0109522 A1 Apr. 19, 2018

Related U.S. Application Data

(63) Continuation of application No. 14/987,622, filed on Jan. 4, 2016, now Pat. No. 9,843,580, which is a (Continued)

(51) Int. Cl.

*H04L 9/08* (2006.01)
*H04L 9/16* (2006.01)
(Continued)

(52) U.S. Cl.

CPC ........ *H04L 63/0869* (2013.01); *H04L 9/0822* (2013.01); *H04L 9/0863* (2013.01); (Continued)

(58) Field of Classification Search

CPC ............... H04L 63/0869; H04L 63/083; H04L 63/0853; H04L 9/0822; H04L 9/0863; H04L 9/3226; H04L 9/3273; H04L 63/123; H04L 9/16; H04L 2209/805; H04W 12/06

See application file for complete search history.

(56) References Cited

U.S. PATENT DOCUMENTS 6,490,680 B1 12/2002 Scheidt et al.
6,842,106 B2 1/2005 Hughes et al.
(Continued)

OTHER PUBLICATIONS

International Search Report and Written Opinion dated Mar. 25, 2009, received in corresponding International application No. PCT/US20091032726, 9 pages.

(Continued)

*Primary Examiner* — Michael Pyzocha
(74) *Attorney, Agent, or Firm* — Procopio, Cory, Hargreaves & Savitch LLP

(57) ABSTRACT

A method for mutual authentication in an RFID system comprising an RFID reader and an RFID tag, the method comprising requesting an identification from the tag, receiving the identification, using the received identification to select a password associated with the identification, generating a password key based on the selected password, encrypting the selected password using the password key, and transmitting the encrypted password to the tag.

20 Claims, 8 Drawing Sheets

100
116
Host Computer
102
Digital Electronics
114
RF Transciever
104
106
108
112
110
Tag

Related U.S. Application Data continuation of application No. 14/225,343, filed on Mar. 25, 2014, now Pat. No. 9,231,947, which is a continuation of application No. 12/363,605, filed on Jan. 30, 2009, now Pat. No. 8,681,987.

(60) Provisional application No. 61/024,826, filed on Jan. 30, 2008.

(51) Int. Cl.

*H04L 9/32* (2006.01)
*H04L 29/06* (2006.01)
*H04W 12/06* (2009.01)

(52) U.S. Cl.

CPC .............. *H04L 9/16* (2013.01); *H04L 9/3226* (2013.01); *H04L 9/3273* (2013.01); *H04L 63/083* (2013.01); *H04L 63/0853* (2013.01); *H04L 63/123* (2013.01); *H04W 12/06* (2013.01); *H04L 2209/805* (2013.01)

(56) References Cited

U.S. PATENT DOCUMENTS

| | | | |
|---|---|---|---|
| 6,883,717 | B1 | 4/2005 | Kelley et al. |
| 7,245,213 | B1 | 7/2007 | Esterberg et al. |
| 7,953,974 | B2 | 5/2011 | Yamamura et al. |
| 2001/0033662 | A1 | 10/2001 | Nishikawa |
| 2003/0021418 | A1 | 1/2003 | Arakawa et al. |
| 2004/0052375 | A1 | 3/2004 | Craft et al. |
| 2005/0235148 | A1 | 10/2005 | Scheidt et al. |
| 2006/0261926 | A1 | 11/2006 | Zimmerman et al. |
| 2007/0008070 | A1 | 1/2007 | Friedrich |
| 2007/0069852 | A1 | 3/2007 | Mo et al. |
| 2007/0120651 | A1 | 5/2007 | Kobayashi et al. |
| 2008/0106386 | A1 | 5/2008 | Li et al. |

OTHER PUBLICATIONS

Extended European Search Report dated Mar. 14, 2013, received in corresponding European application No. 09706497.6, 14 pages.

RFID AUTHENTICATION ARCHITECTURE AND METHODS FOR RFID AUTHENTICATION

CROSS-REFERENCE TO RELATED APPLICATIONS

This application in a continuation of application Ser. No. 14/987,622, filed Jan. 4, 2016, entitled, "RFID Authentication Architecture and Methods For RD Authentication," which is a continuation of application Ser. No. 14/225,343, filed Mar. 25, 2014, now U.S. Pat. No. 9,231,947, entitled, "RFID Authentication Architecture and Methods For RD Authentication," which is a continuation of application Ser. No. 12/363,605, filed Jan. 30, 2009, now U.S. Pat. No. 8,681,987, entitled, "RFID Authentication Architecture and Methods For RD Authentication," which claims priority under 35 U.S.C. 119(e) to U.S. Provisional Application Ser. No. 61/024,826, filed Jan. 30, 2008, and entitled "RFID-Based Authentication Using Non-Volatile Memory with Read/Write Energy Symmetry," which is incorporated herein by reference in its entirety as if set forth in full.

BACKGROUND

Technical Field

The embodiments described herein are related to Radio Frequency Identification (RFID) systems and more particularly to methods and apparatus to prevent unwanted and/or unwarranted access to information stored on an RFID chip.

Related Art

RFID is an automatic identification method, relying on storing and remotely retrieving data using devices called RFID tags or transponders. The technology requires some extent of cooperation of an RFID reader and an RFID tag. An RFID tag is an object that can be applied to or incorporated into a variety of products, packaging, identification mechanisms, etc., for the purpose of identification and tracking using radio waves. For example, RFID is used in enterprise supply chain management to improve the efficiency of inventory tracking and management. Some tags can be read from several meters away and beyond the line of sight of the reader.

Most RFID tags contain at least two parts: One is an integrated circuit for storing and processing information, modulating and demodulating a radio-frequency (RF) signal, and other specialized functions. The second is an antenna for receiving and transmitting the signal. As the name implies, RFID tags are often used to store an identifier that can be used to identify the item to which the tag is attached or incorporated. But in today's systems, a RFID tag can contain non-volatile, possibly writable, e.g., EEPROM for storing additional data as well.

Most RFID systems use a modulation technique known as backscatter to enable the tags to communicate with the reader or interrogator. In a backscatter system, the interrogator transmits a Radio Frequency (RF) carrier signal that is reflected by the RFID tag. In order to communicate data back to the interrogator, the tag alternately reflects the RF carrier signal in a pattern understood by the interrogator. In certain systems, the tag can include its own carrier generation circuitry to generate a signal that can be modulated with data to be transmitted to the interrogator.

RFID tags come in one of three types: passive, active, and semi passive. Passive RFID tags have no internal power supply. The minute electrical current induced in the antenna by the incoming RF signal from the interrogator provides just enough power for the, e.g., CMOS integrated circuit in the tag to power up and transmit a response. Most passive tags signal by backscattering the carrier wave from the reader. This means that the antenna has to be designed both to collect power from the incoming signal and also to transmit the outbound backscatter signal.

Passive tags have practical read distances ranging from about 10 cm (4 in.) (ISO 14443) up to a few meters (Electronic Product Code (EPC) and ISO 18000-6), depending on the chosen radio frequency and antenna design/size. The lack of an onboard power supply means that the device can be quite small. For example, commercially available products exist that can be embedded in a sticker, or under the skin in the case of low frequency RFID tags.

Unlike passive RFID tags, active RFID tags have their own internal power source, which is used to power the integrated circuits and to broadcast the response signal to the reader. Communications from active tags to readers is typically much more reliable, i.e., fewer errors, than from passive tags.

Active tags, due to their on board power supply, also may transmit at higher power levels than passive tags, allowing them to be more robust in "RF challenged" environments, such as environments with humidity; with dampening targets, including humans/cattle, which contain mostly water; reflective targets such as metal, shipping containers, vehicles, etc.; or at longer distances. In turn, active tags are generally bigger, caused by battery volume, and more expensive to manufacture, caused by battery price.

Many active tags today have operational ranges of hundreds of meters, and a battery life of up to 10 years. Active tags can include larger memories than passive tags, and may include the ability to store additional information received from the reader, although this is also possible with passive tags.

Semi-passive tags are similar to active tags in that they have their own power source, but the battery only powers the microchip and does not power the broadcasting of a signal. The response is usually powered by means of backscattering the RF energy from the reader, where energy is reflected back to the reader as with passive tags. An additional application for the battery is to power data storage.

The battery-assisted reception circuitry of semi-passive tags leads to greater sensitivity than passive tags, typically 100 times more. The enhanced sensitivity can be leveraged as increased range, by one magnitude, and/or as enhanced read reliability, by reducing bit error rate at least one magnitude.

The enhanced sensitivity of semi-passive tags place higher demands on the interrogator concerning separation in more dense population of tags. Because an already weak signal is backscattered to the reader from a larger number of tags and from longer distances, the separation requires more sophisticated anti-collision concepts, better signal processing and some more intelligent assessment of which tag might be where.

FIG. 1 is a diagram illustrating an exemplary RFID system 100. In system 100, RFID interrogator 102 communicates with one or more RFID tags 110. Data can be exchanged between interrogator 102 and RFID tag 110 via radio transmit signal 108 and radio receive signal 112. RFID interrogator 102 comprises RF transceiver 104, which contains transmitter and receiver electronics, and antenna 106, which are configured to generate and receive radio transit signal 108 and radio receive signal 112, respectively. Exchange of data can be accomplished via electromagnetic or electrostatic coupling in the RF spectrum in combination with various modulation and encoding schemes.

RFID tag 110 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. battery. Passive RFID tags power themselves by rectifying the RF signal emitted by the RF scanner. Consequently, the range of transmit signal 108 determines the operational range of RFID tag 110.

RF transceiver 104 transmits RF signals to RFID tag 110, and receives RF signals from RFID tag 110, via antenna 106. The data in transmit signal 108 and receive signal 112 can be contained in one or more bits for the purpose of providing identification and other information relevant to the particular RFID tag application. When RFID tag 110 passes within the range of the radio frequency electromagnetic field emitted by antenna 106, RFID tag 110 is excited and transmits data back to RF interrogator 102. A change in the impedance of RFID tag 110 can be used to signal the data to RF interrogator 102 via receive signal 112. The impedance change in RFID tag 110 can be caused by producing a short circuit across the tag's antenna connections (not shown) in bursts of very short duration. RF transceiver 104 senses the impedance change as a change in the level of reflected or backscattered energy arriving at antenna 106.

Digital electronics 114, which can comprise a microprocessor with RAM, performs decoding and reading of receive signal 112. Similarly, digital electronics 114 performs the coding of transmit signal 108. Thus, RF interrogator 102 facilitates the reading or writing of data to RFID tags, e.g. RFID tag 110 that are within range of the RF field emitted by antenna 104. Together, RF transceiver 104 and digital electronics 114 comprise reader 118. Finally, digital electronics 114 and can be interfaced with an integral display and/or provide a parallel or serial communications interface to a host computer or industrial controller, e.g. host computer 116.

Today, RFID tags are being incorporated into sensitive documents and identification devices such as passports; travel cards, e.g., the travel card being introduced under the Western Hemisphere Travel Initiative (WHTI); driver's licenses; etc. Most of the RFID protocols in use today do not require a password or other authentication/verification scheme to read information from an RFID tag. Since some of these tags can be read at more than 20 ft, any reader operating at the same frequency and using the same protocol as the tag can read the tag's information. Moreover, there are no methods presently to detect an unauthorized reading of the tag, so the user would have no idea their information has been read. This is major concern for privacy of the individual or the object which is being tagged.

SUMMARY

According to one aspect, a method for mutual authentication in an RFID system comprising an RFID reader and an RFID tag, the method comprising requesting an identification from the tag, receiving the identification, using the received identification to select a password associated with the identification, generating a password key based on the selected password, encrypting the selected password using the password key, and transmitting the encrypted password to the tag.

According to another aspect, a method for mutual authentication in an RFID system comprising an RFID reader and an RFID tag, the method comprising providing a tag identifier to the reader, receiving an encrypted password in response, decrypting the encrypted password using a password key, verifying the decrypted password, sending an acknowledgement if the password can be detected and verified, receiving a read memory request in response to the acknowledgement, and executing the read memory request.

According to still another aspect, an authentication scheme provides a means of changing a password and a password key, and synchronizing between an interrogator and a tag, and possibly a server. The password and password key can be change on demand. The password in the tag is initialized at foundry and can be reloaded at depot. The password changes can also be changed by algorithm and changed on command or after a programmable number of successful accesses.

According to still another aspect, a mutual authentication method comprises a capability to generate new password keys on demand, if the fixed password is encrypted with an incorrect password key.

According to still another aspect, a mutual authentication method comprises a capability to synchronize the password keys used in encryption and decryption amongst server, interrogator, and tag used in an RFID system.

According to still another aspect, a mutual authentication method comprises a capability to employ shuffling, exchanging, and altering of components of the password key but in a manner that is known among the server, interrogator, and tag.

According to still another aspect, a mutual authentication method comprises a capability to adjust a security level by dynamically selecting a mathematical kernel.

According to still another aspect, a mutual authentication method comprises a capability to manage known secrets among interrogators and tags.

According to still another aspect, a memory technology is provided in conjunction with the authentication method for use in RFID systems at distances of 5 to 30 or more feet.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Most of RFID chips are designed for supply chain applications like pallet tracking, etc. For these applications privacy issues like cloning and skimming, etc., are not an issue. But, when these RFID chips are used to make RFID tags that are then used in security applications like identification cards, passports, visas, etc., privacy becomes a big concern. Unfortunately, the RFID tags themselves do not incorporate any privacy features to prevent unwarranted access to the information stored on the tag. Even passive RFID tags, when used with suitable equipment, are able to read up to 20-30 feet. With such high potential read ranges, there is always a chance of unauthorized access to the information stored in the RFID chip without such access being noticed by the user.

In the embodiments described below, a mutual authentication scheme between an RFID interrogator, or reader and an RFID tag is used to improve security of the data stored in the tag. In certain embodiments, the reader can also be configured to authenticate itself with the server.

Consider an RFID Ultra High Frequency (UHF) environment. In such environments, communication transactions between tags and readers must in many cases occur at a distance of up to 5 to 30 feet. In the embodiments described herein, a device, such as a card, document, or other device that includes, or has affixed an RFID tag or circuit must have an authenticated request to transfer data to the reader. This requires the reader to authenticate itself to the tag. Likewise the tag must authenticate that it is valid to transmit data in response to the reader command: This is mutual authentication. As opposed to a conventional system in which the reader does not demonstrate that it is a valid reader before retrieving data from the tag.

Figure 1:
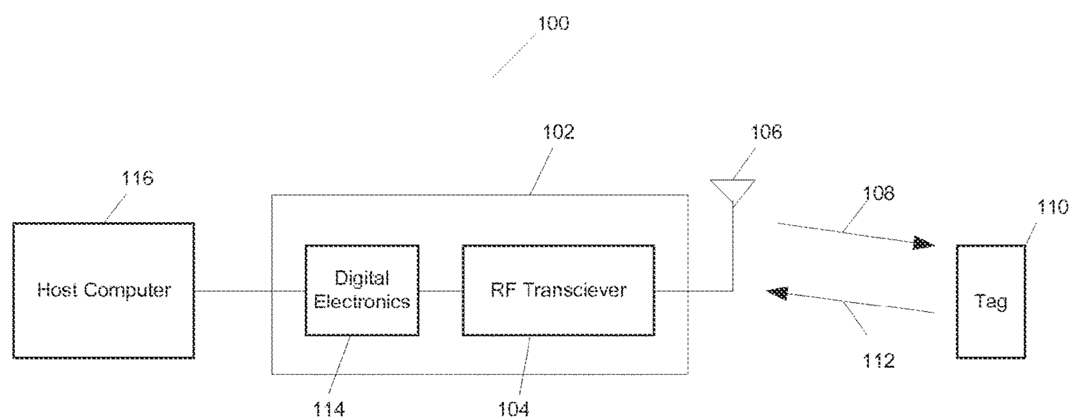
FIG. 1 is a diagram illustrating an exemplary RFID system.
Figure 2:
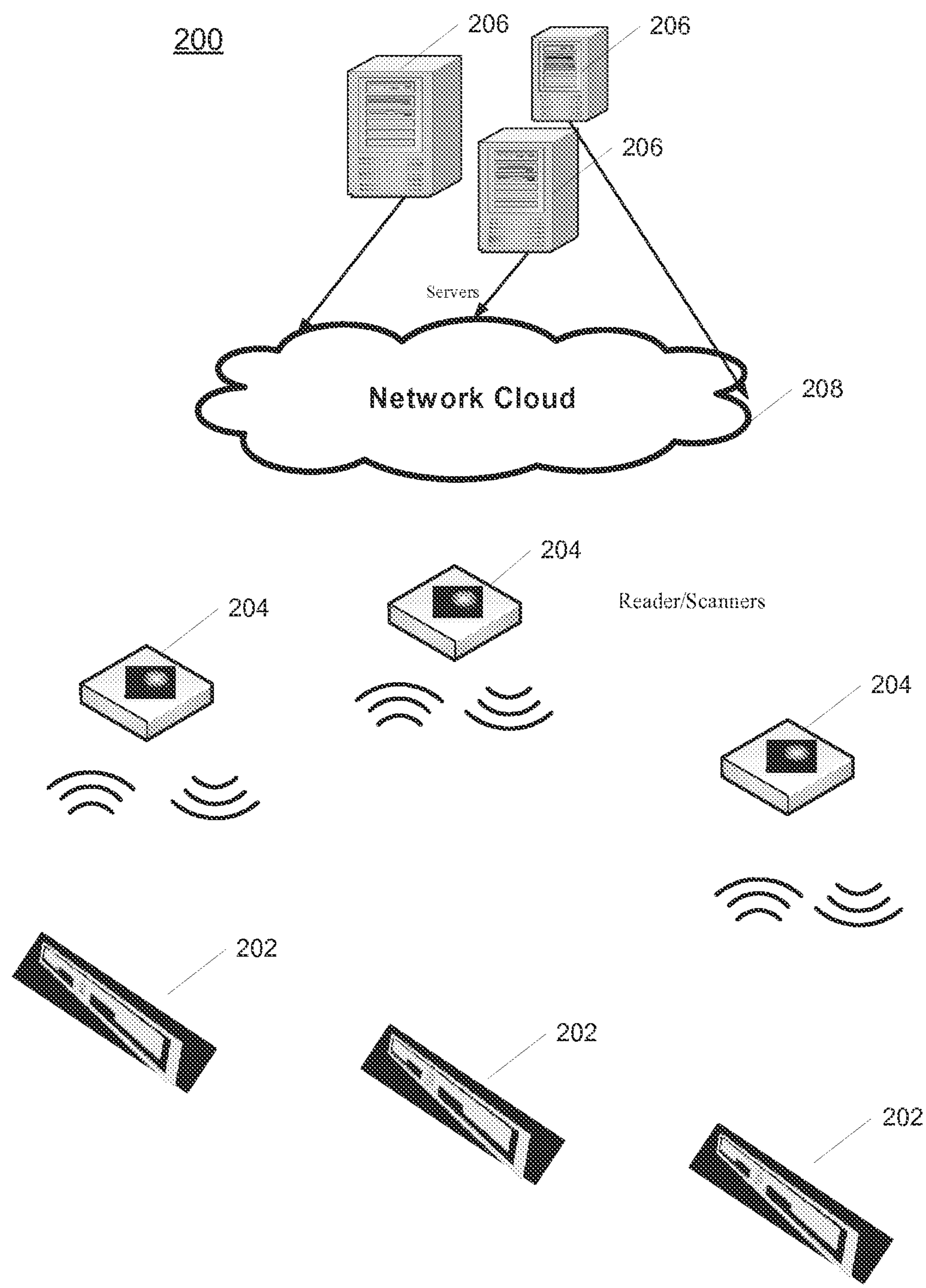
FIG. 2 is a diagram illustrating an RFID system in accordance with one embodiment.

FIG. 2 is a diagram illustrating an example RFID system 200 in accordance with one embodiment. System 200 comprises a plurality of tags 202 in communication with one or more readers 204. Readers 204 can in turn be in communication with one or more servers 206 via network 208. Each reader 204 can be a wirelessly connected handheld or a hardwired connected unit.

Considering the limited energy available on an RFID tag 202, the computational requirements to support authentication within system 200 must be kept to a minimum. All conventional password techniques face a difficulty in not being able to use intense computational algorithms to effect password security.

In certain conventional systems, the RFID tag can store a password that can be used to provide a certain level of security. In such conventional systems, the tag passwords are fixed, permanent components of the tag security. In the embodiments described below, the password is changeable as is a password key used to encrypt the password. This provides increased security of the memory contents of the tag. Some conventional systems use a security key to manage changes in tag passwords; however, the embodiments described herein provide for a means of changing the password and password key, and synchronizing the password and password key change on demand. The password changes can also be changed by algorithm and changed on command or after a programmable number of successful accesses, features not shown.

The tag can be initialized at the foundry to store certain passwords and other secret information, which can also be reloaded at a depot.

To apply a one time programmable (OTP) password in an RFID system requires key management for security. The key either needs to be chaotically driven or stored and refreshed periodically in the tag. The key is typically generated by a sequence generation circuit. As is known, a sequence generation circuit comprises a number of delay units and a number of taps configured to feed an input sequence to the delay units. A predetermined sequence, or seed sequence, is used to generate an output sequence. In the case of a chaotically driven password generator, a randomized seed number is often employed. This situation requires refreshing the seed number in the key generator to keep it random. Also it requires the update of other components of the system, such as a reader or the server to function with newly generated passwords. A weakness of such conventional OTP systems is that the randomness in password generation is not adequately maintained and with over the air transmissions, the password can be intercepted and decoded by a rogue reader over time.

Figure 4:
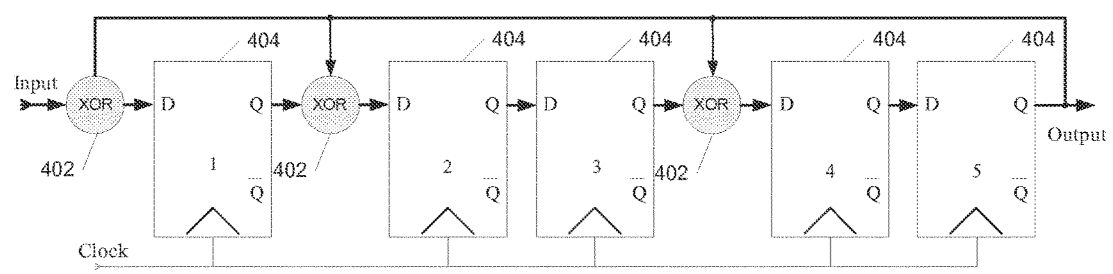
FIG. 4 is a diagram illustrating a PRSG that can be used in the circuit of FIG. 3 in accordance with one embodiment.

To address the password uniqueness, the embodiments described herein comprise a dynamically configurable pseudo random sequence generator (PRSG) 400 as illustrated in FIG. 4. The taps for this PRSG are loaded into a Non-Volatile Memory (NVM) for use in the authentication scheme described herein. The loaded taps must be in index sets of a known order. The number of tap sets is limited only by the memory space allocated. The memory is loaded at the time tag is manufactured and can be reloaded at a depot. The memory used to store the components for key generation should not be available to be read over the air, but rather should be used by the tag's microprocessor in managing the tag's password.

The components for generating a key that can be used to manage the tag's p[password in system 200 can consist of the taps in the pseudorandom number PRSG, the number of cycles the PRSG is run, and an initialization vector (IV). These components together make up the inputs to a mathematical kernel for password key generation. Any number of mathematical kernels can be loaded into NVM, limited only be the allocated capacity of the tag. Each stored mathematical kernel should be index to assist in synchronization.

In PRSG 400 each tap 402 is represented by an XOR gate. The number of flip-flops 404 can be configurable and can range from, e.g., three to n, depending on the length of password desired. In the example of FIG. 4, PRSG 400 has taps before the first, second, and fourth flip-flops. In general each flip-flop 404 will be preceded by a tap 402; however, depending on the size of the sequence generated for use as a password key, different taps 402 will be selected.

Thus, the initial steps in creating a password key have been described, i.e., a kernel with inputs such as the tap set, cycles, and IV, e.g., for PRSG 400, can be determined, indexed, and stored in the tag and the interrogator. As stated, the actual PRSG should have a length equivalent to the password's length; that is, a length of 32, 64, or 128 bits for instance. Each bit requires a flip-flop. The configurable PRSG 400 can activate XOR gates before each flip-flop to achieve a maximal length PRSG. The XOR gates required to make this PRSG maximal length are known from Galois Field theory over binary numbers. Because the PRSG is configurable in embodiments described herein, submaximal sequences can also be employed but to keep password keys identifiable internally to the system components, maximal length configurations of the PRSG should be used for each password length. This would provide about 4 billion keys of 32-bits length, as an example. The taps used for PRSG 400 should not be broadcast over the air, but can be loaded at tag initialization in foundry or later in depot as part of the mathematical kernel.

The IV can be any binary number of a length equal to the password's length. Also the IV can be stored as one of the components in an NVM to make up the mathematical kernel for PRSG 400 functions. The IV should also not be broadcasted but should be known to the interrogator 204 and tag 202.

The third input to the kernel can be the number of cycles that PRSG 400 runs through. This is a variable which can extend from 1 to the repeat number for maximal length pseudo random number PRSG. This number is based on the length of the generator and indirectly on the taps chosen; both are a consequence of Galois Field theory over binary numbers. The number of cycles should also not be broadcasted but should not be known to an interrogator and a tag.

Each of these elements described above make up the mathematical kernel for operating the PRSG. The mathematical kernel can be indexed and stored in the tag's NVM for later recall.

In certain embodiments, scrambling can be selected for the password key. Different choices for implementing scrambling should also be indexed as well for synchronization to function in password decryption. Scrambling can be used to further improve the authentication mechanism.

Figure 5:
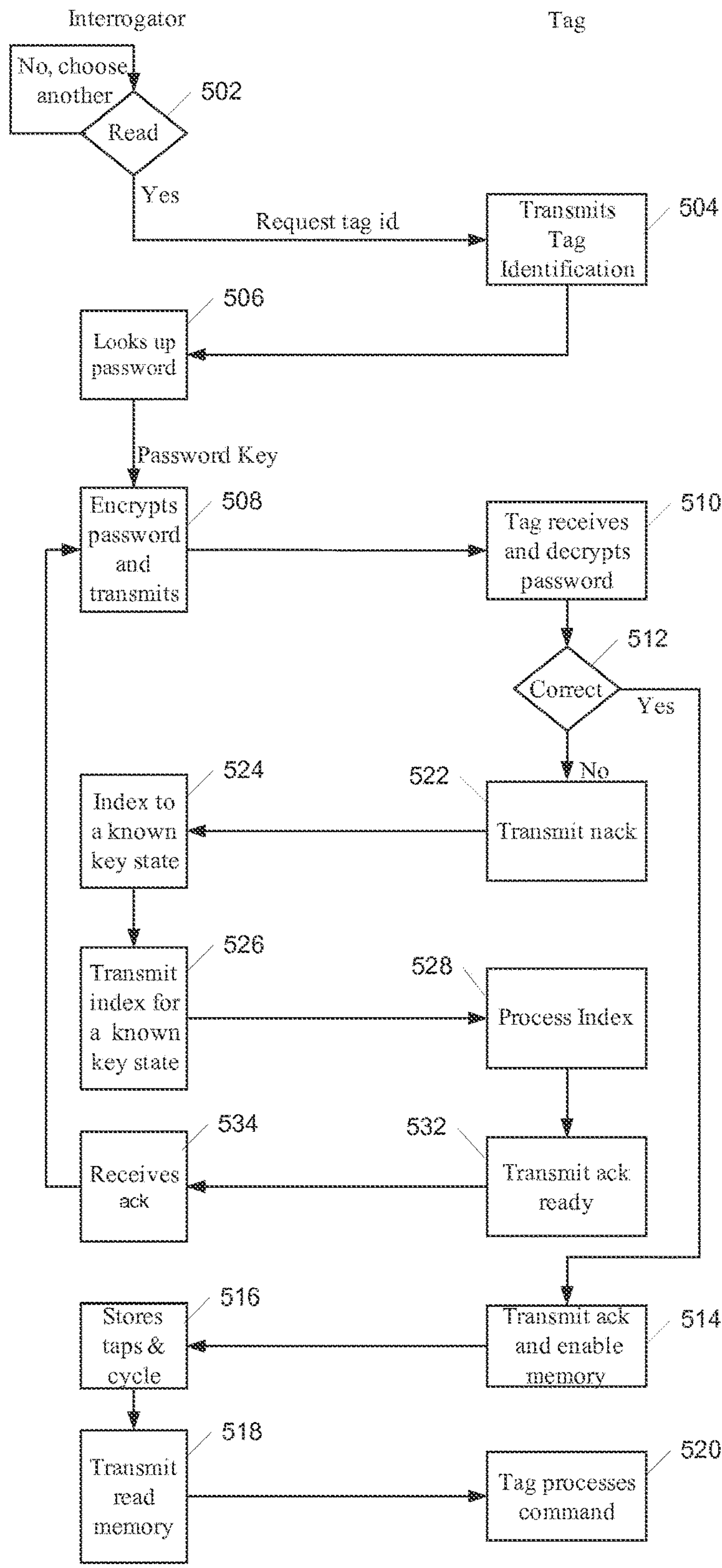
FIG. 5 is a flow chart illustrating an example method for mutual authentication between a reader and a tag in the system of FIG. 2 in accordance with one embodiment.
Figure 6:
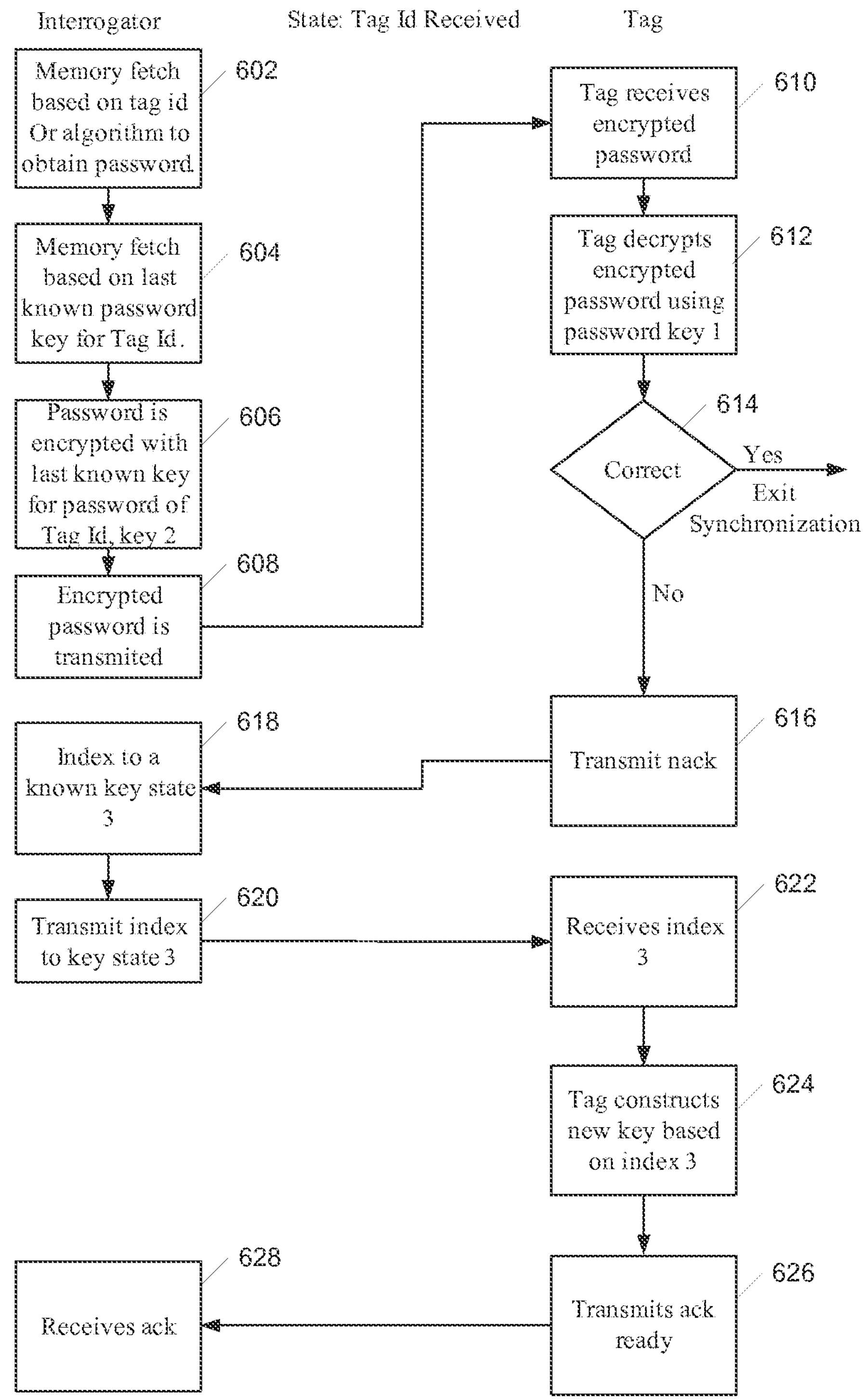
FIG. 6 is a flow chart illustrating certain steps of the process of FIG. 5 in more detail and in accordance with one embodiment.
Figure 7:
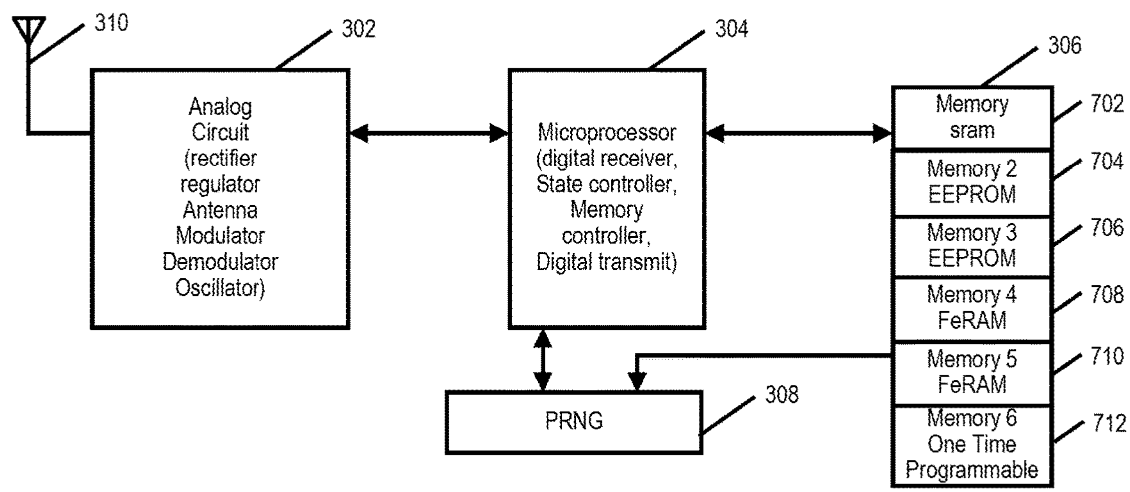
FIG. 7 is a diagram illustrating another example embodiment of the RFID tag circuit of FIG. 3.

In the embodiments described herein, the index to the kernel, and possibly to the scrambling choice, can be transmitted in clear text from the interrogator to the tag, but the index will only be actionable by a tag equipped with the capability to execute the password key algorithm illustrated in FIGS. 5-7.

Each tag's ID can then be associated with a set of tag passwords or mathematical kernels. Upon the receipt of a tag's ID (see step 504 in FIG. 5), an interrogator can be configured to load the correct set of tag passwords from either a local database in the interrogator or a remote database.

Figure 3:
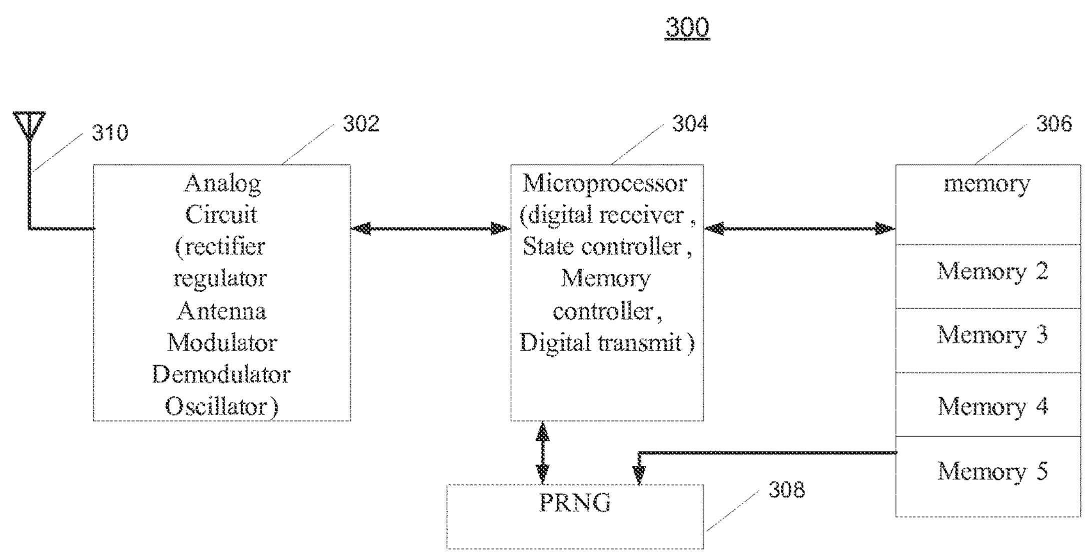
FIG. 3 is a diagram illustrating an example RFID tag circuit that can be used in the system of FIG. 2 in accordance with one embodiment.

In a tag 202 configured in accordance with the embodiments described herein, a PRSG 400 along with a scalable scrambling logic can be configured to determine a new password key for encrypting the tag's password. The amount of scrambling is programmable up to a full encryption processor such as an AES 128. The major steps of the authentication process are shown in FIG. 5. As shown in FIG. 3, the Memory 5 location in tag memory 306 can hold the mathematical kernel for PRSG 400 as well as the inputs to the kernel, e.g., the tap set, IV, and cycle. The values of the kernel components can be known to interrogator 204 and can be transmitted to server 206 for backup and the use of other interrogators.

The security of the mutual authentication embodiments described herein can also be scalable. To increase the security level a stronger password encryption can be employed. In this scheme the length of the password can be extended. Likewise the encryption can also be extended. This means that more time would be required to break the password encryption because it is longer and the processing time for a brute force attach increases for a longer encrypted password. The scrambling scheme is scalable, where the shuffling of data is made ever more complicated. This also adds scalable security to the encryption password authentication process.

Figure 8:
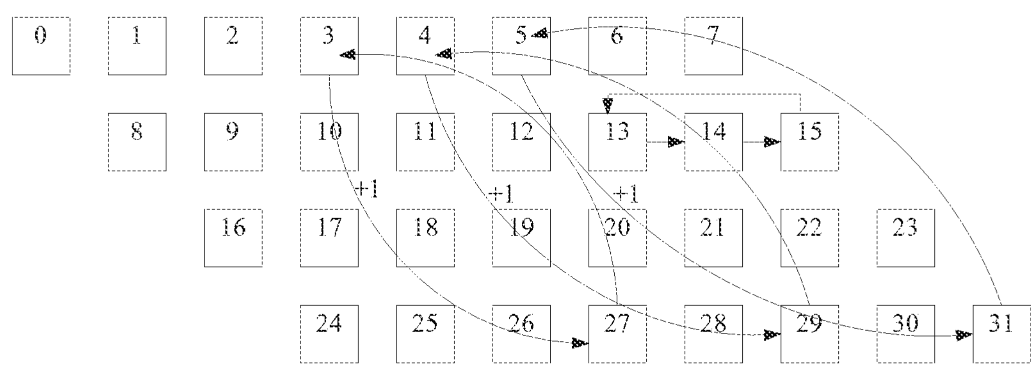
FIG. 8 is a diagram illustrating an example of scrambling a 32-bit password key, such as the password key generated by the PRSG of FIG. 4.

Scrambling the output from PRSG 400 can be accomplished by a series of manipulations to the password key. FIG. 8 is a diagram illustrating an example method for scrambling the output of PRSG 400 in accordance with one embodiment. The method of FIG. 8 is by way of example and is not to be exhaustive of the possible practical variations of the same method in other guises. The password key output from PRSG 400 can be taken for example as a 32-bit key comprising bits 0-31. Several operations can then be performed on the bits. In the example of FIG. 8, three operations are performed. The first is to move bits 27, 29, and 31 to bit positions 3, 4, and 5. The second is to add one to the original 3, 4, and 5 bit positions and place them in bit positions 27, 29, and 31. The last is to take positions 13, 14, and 15 and rotate the bits by one. The result is the final password key.

The number of operations, whether replacing, adding, or shifting can be extended to increase the difficulty of breaking the password key, as well as extending it to longer password key lengths. Each choice is fixed but can be indexed in the tag. The index applies to the same scrambling sequence in the interrogator. The same index is used coincident with the index for the mathematical kernels. Thus, an index makes synchronization of the entire password key process possible among server 206, interrogator 204, and tag 202.

FIG. 3 is a diagram illustrating an RFID tag circuit 300 in accordance with one embodiment. Tag circuit 300 can comprise an analog front end 302, baseband circuit 304, memory 306, and PRSG 308, which can be similar to PRSG 400 as described above. Analog front end 302 can be configured to send and receive radio frequency signals via antenna 310. Thus, analog front end 302 can comprise the rectifiers, regulators, modulators, demodulators, oscillators, filters, etc., required to receive a radio frequency signal, convert it to, or demodulate it to a digital signal and to transmit a radio frequency signal, modulated by a digital signal.

Baseband circuit 304 can comprise the digital circuitry necessary to decode digital signals provided by analog front end 302 and to execute commands or respond to requests included therein. Thus, baseband circuit 304 can comprise the digital receive and transmit circuitry necessary to interface with analog front end 304, memory controllers, state controller, etc. PRSG 308 can, depending on the embodiment, be part of baseband circuit 304.

Memory 306 can comprise Non-Volatile Memory technology such as EEPROM or FeRAM and can be configured to store data such as a password, identifying information, etc. Additionally, memory 306 can be configured to store other data such as biometric information, tracking information, vehicle identifying information, etc.

As can be seen, memory 306 can be partitioned into a plurality of sections. Each section can be configured to store different types of information. For example, data such as biometric data, etc., can be stored in the first memory section, whereas memory section 1 through 5 can be configured to store other specific data. For example, these sections can be configured to store the tag's password, the tag's identifier, etc. In the embodiment of FIG. 3, memory section 5 can store the tap values for PRSG 308, e.g., three tap values, as well as the initialization vector and the cycle count for PRSG 308.

Several sets of the tap values can be written into memory 306 during the manufacturing process. These values can also be known to the interrogator/reader 204 and can be transmitted to the server 206 for backup and for use by other interrogators/readers 204. The interrogators/readers 204 can also have or have access to the tag passwords. In certain embodiments, each interrogator/reader 204 does not have the entire population of tag passwords or all sets of tap values. For example, a geographical area of use can have the common population of passwords and tap values. In this manner, out of area tags can be easily identified. In this manner, if an out of area tag appeared, it could be processed to the server.

Data stored m memory can be cipher or plain text data. As improvements are made in reducing process power more energy consuming but stronger encryption algorithms can be employed; for example, the use of AES 128 encrypting algorithms in protecting the password(s) for the memory or memory blocks in a tag.

The tap values loaded into memory 306 can be in index sets of a known order. The number of taps sets is limited only by the memory allocated. The sections of memory 306 used to store the components for key generation should not be available to be read via over the air, but will be used by the tag's microprocessor 304 in managing the tag's password.

FIG. 5 is a flow chart illustrating an example process for mutual authentication in accordance with one embodiment. The steps carried out by reader 204 are illustrated on the left hand side of the figure, while the steps carried out by the tag are illustrated on the right hand side.

In step 502, the reader executes a request for the tag's identifier. In step 504, the tag responds by sending its identifier. Other than the identifier, however, the tag's memory cannot be read without the correct password. In order to supply the correct password, in step 506 the reader looks up the password associated with the identifier received in step 504. For example, in one implementation, the reader draws from its on-board database the last known tap set, the cycles run, and the IV in that tap set. The cycle represents the number of times the generator was clocked. These outputs are the password key. The key is used to encrypt the stored password for the tag's identifier. The encrypted password is transmitted to the tag in step 508.

The tag receives and decrypts the password in step 510 and compares it with its stored password in step 512. If the password is correct then the status of the successful transmission is acknowledged to the reader in step 526. The reader then can access the memory or a portion of the memory, e.g., according to the segregation of memory by password type.

More specifically, when the reader receives the acknowledgement in step 528, it can store the taps and cycle information. In step 530, the reader can transmit a read memory command, which can be received and processed by the tag in step 532.

If the password transmitted in step 508 fails the decryption of step 510, then a negative acknowledgement (nack) is sent to the reader in step 514. The tag can then be commanded into a known tap set load and cycled to a known number of clockings of PRSG 400, e.g., based on a re-configurable pseudorandom number generator with a known initialization vector. The tag then will have a decryption key, which is synchronized to the reader's key. The reader then re-transmits the tag's encrypted password to the tag.

Thus, referring to FIG. 5, when the tag transmits the negative acknowledgement in step 514, the reader can receive the negative acknowledgement and generate an index to a known key state in step 516, which it can transmit to the tag in step 518. In step 520, the tag can receive the index and process it and return an acknowledgement in step 522. The reader can receive the acknowledgement in step 524 and then retransmit an encrypted password using the new key in step 508.

This process can be re-tried for a set maximum number of times, e.g., seven times, adjustable at build, before a tag goes to sleep. The tag will remain in sleep mode for a programmable amount of time. The sleep time can be less than 20 minutes for example. Also, the tag can be configured to increment its tap values by changing index any time the seven attempts were reached or after a fixed number of memory reads of certain memory locations has occurred.

A more detailed description of the password key synchronization in accordance with one embodiment is illustrated in the flow chart of FIG. 6. In this example it is assumed that the tag has already responded with its identification (step 504). As the process continues an authentication of the encrypted password is attempted (steps 510 and 512) it may be that the interrogator is not using the same index to key parameters necessary to generate the correct key for decrypting the password (step 510) on the tag. As a result the tag cannot verify a correct password (step 512) because the interrogator is using a different encryption key, and the tag will not respond to memory read or write requests (step 520).

The tag should have stored in its memory information necessary to construct many keys for decryption of passwords. Likewise the interrogator also should have the same information and indexing to this information. The interrogator chooses any index to the information to construct a new key in steps 602 and 604, other than the one used previously and that resulted in the negative acknowledgement (step 522) from the tag. This new index is used to encrypt the password in step 606 and the encrypted password is transmitted in step 608. The tag then receives the encrypted password in step 610 and used it to construct a new password decryption key to use in decrypting the transmitted password (in step 612).

If the authentication works, then process exits to step 522. If not, then the tag transmits a negative acknowledgement in step 616. The interrogator will then construct a new key and use it to encrypt a password in step 618. The encrypted password is then transmitted in step 620. The tag receives the new password in step 622 and constructs a key to use in decrypting the encrypted password in step 624. The tag can then transmit an acknowledgement (ack) in step 626, which can be received by the interrogator in step 628, assuming the process works this time.

In summary then the authentication method described here consists of several features. The first is a capability to generate new password keys on demand, if the fixed password is encrypted with an incorrect password key. The second is to synchronize the password keys used in encryption and decryption among the server, interrogator, and tag used in an RFID system. Third, the authentication method employs shuffling, exchanging, and altering of components of the password key but in a manner that is known amongst the server, interrogator, and tag.

Each interrogator 204 would not necessarily have the entire population of tag passwords or mathematical kernels. Rather the geographical area of use would have the common population. If an out of area tag appeared, it could be processed to the server. Also, tag 202 can be configured to increment its index of the mathematical kernel any time the maximum number of attempts were reached, e.g., seven, or after a fixed number of memory reads of certain memory locations had occurred, all programmable at depot. Data stored in memory can be cipher or plain text data. As improvements are made in reducing process power requirements, stronger encryption algorithms can be employed with less required energy; for example, the use of AES 128 encrypting algorithms in protecting the password(s) for the memory or memory blocks in a tag.

Another feature of this method of password key synchronization is that the instructions for each index are loaded at factory and can be reloaded at any time in the life of the tag by bringing it into a depot.

In certain embodiments, interrogator/reader 204 can be required to authenticate itself to the server 206. This can be accomplished, for example, using Diffie-Helman-Merkel coding for over the air protocol similar to computer to computer authentication. The communication links between readers 204 and servers 206 can be Wi-Fi, WLAN, hardwire Ethernet, USB, or Bluetooth, or others. Interrogator 204 can be linked to a secure server 206, running a protocol for login and data transfer between server 206 and interrogator 204, using encryption coding above as an example, and obtain for its geographical region of operation an update in mathematical kernels for tags 202 of the region. This link provides a method for refreshing the interrogators 204 on the state of all tags' mathematical kernel for key generation in a given geographical area. Should an interrogator 204 get into the custody of an unauthorized or unethical person, the mathematical kernels can be stored in hardware, software, or any combination of the interrogator to frustrate extraction of the information on the password key method.

Non volatile memory with symmetrical read and write distances increases the range of writing to an RFID memory. This means that memory operations can occur at greater distances for the same energy of reading the tag, e.g., in the UHF band. The applications of this capability in RFID are updating a tag's memory at greater distances, reducing memory write times, reducing memory write power, and increasing memory endurance. The reduction in memory power and write times provides for the opportunity to increase security computation and remain power neutral. A common non volatile memory for accomplishing this function is ferroelectric random access memory (FeRAM).

Consequently, different types of memory devices can be used for memory 306. FIG. 7 is a diagram illustrating RFID circuit 300 of FIG. 3 with a plurality of memory devices making up memory 306. In the embodiment of FIG. 7, memory 306 comprises an SRAM portion 702, EEPROM portions 704 and 706, FeRAM portions 708 and 710, and an OTP portion 712. It will be understood that the embodiment of FIG. 7 is by way of example only and is meant to illustrate that memory 306 can be made up of different device types, packaged separately or together. Although, using certain types of memory for certain portions of memory 306, i.e., to store certain types of information used in certain types of operations, can be advantageous, but this will depend on the requirements of a particular implementation.

Similarly, it will be understood that analog front end 302 and baseband circuit 304 can comprise multiple device or circuits packaged together or separately.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A method for mutual authentication in a radio frequency identification (RFID) system comprising an RFID reader and an RFID tag, the method comprising:

receiving, at the RFID reader, an identifier from the RFID tag;

selecting a password based at least in part on the identifier;

selecting a first mathematical kernel having a first parameter set;

generating a first password key based on the first mathematical kernel;

encrypting the password as a first encrypted password based on the first password key; and transmitting the first encrypted password to the RFID tag.

2. The method of claim 1, further comprising:

receiving an acknowledgement (ACK) from the RFID tag indicating successful verification of the first encrypted password;

transmitting a read memory request to the RFID tag in response to the ACK; and receiving data from the RFID tag in response to the read memory request.

3. The method of claim 1, further comprising:

receiving a negative acknowledgement (NACK) from the RFID tag indicating an unsuccessful verification of the first encrypted password;

selecting a second mathematical kernel in response to the NACK, the second mathematical kernel having a second parameter set different from the first parameter set;

transmitting an index corresponding to the second mathematical kernel to the RFID tag;

receiving a first acknowledgement (ACK) from the RFID tag indicating receipt of the index;

generating a second password key based on the second mathematical kernel;

encrypting the password as a second encrypted password based on the second password key; and transmitting the second encrypted password to the RFID tag.

4. The method of claim 3, further comprising:

receiving a second ACK from the RFID tag indicating successful verification of the second encrypted password;

transmitting a read memory request to the RFID tag in response to the second ACK; and receiving data from the RFID tag in response to the read memory request.

5. The method of claim 1, further comprising scrambling the first password key.

6. The method of claim 5, wherein the first password key is scrambled based on one of a plurality of indexed scrambling logic.

7. The method of claim 5, wherein the scrambling of the first password key comprises shuffling at least a portion of a plurality of bits comprising the password key.

8. The method of claim 5, wherein the scrambling of the first password key comprises exchanging at least a portion of a plurality of bits comprising the first password key.

9. The method of claim 5, wherein the scrambling of the first password key comprises altering at least a portion of a plurality of bits comprising the password key.

10. The method of claim 1, wherein generating a first password key based on the first mathematical kernel comprises running a pseudorandom sequence generator (PRSG) based at least in part on the first parameter set, wherein a length of the PRSG corresponds to a length of the password.

11. The method of claim 10, wherein the first parameter set includes one or more values for a tap set for the PRSG, a number of cycles to run the PRSG, and an initialization vector (IV) associated with the tap set.

12. A method for mutual authentication in an RFID system comprising an RFID reader and an RFID tag, the method comprising;

transmitting an identifier to the RFID reader;

receiving a first encrypted password based on a first password key, the first password key being generated using a first mathematical kernel having a first parameter set;

transmitting a first acknowledgement (ACK) to the RFID reader based on a successful verification of the first encrypted password;

receiving a read memory request from the RFID reader in response to the first ACK; and transmitting data stored at the RFID tag to the RFID reader in response to the read memory request.

13. The method of claim 12, further comprising:

transmitting a negative acknowledgement (NACK) to the RFID reader based on an unsuccessful verification of the first encrypted password;

receiving an index corresponding to a second mathematical kernel in response to the NACK, the second mathematical kernel having a second parameter set different from the first parameter set;

transmitting, to the RFID reader, a second ACK in response the index;

receiving, from the RFID reader, a second encrypted password based on a second password key generated using the second mathematical kernel;

verifying the password encrypted using the second password key;

transmitting a third ACK to the RFID reader in response to a successful verification of the second encrypted password;

receiving a read memory request from the RFID reader in response to the third ACK; and transmitting data stored at the RFID tag to the RFID reader in response to the read memory request.

14. The method of claim 12, wherein the first password key is scrambled based on one of a plurality of scrambling logic.

15. The method of claim 14, wherein the first password key is scrambled by shuffling at least a portion of a plurality of bits comprising the password key.

16. The method of claim 14, wherein the first password key is scrambled by exchanging at least a portion of a plurality of bits comprising the first password key.

17. The method of claim 14, the first password key is scrambled by altering at least a portion of a plurality of bits comprising the first password key.

18. The method of claim 12, wherein using the first mathematical kernel to generate the first password key comprises running a pseudorandom sequence generator (PRSG) based at least in part on the first parameter set, wherein a length of the PRSG corresponds to a length of the password.

19. The method of claim 18, wherein the first parameter set includes one or more values for a tap set for the PRSG, a number of cycles to run the PRSG, and an initialization vector (IV) associated with the tap set.

20. The method of claim 12, wherein verifying the password encrypted using the first password key comprises:

decrypting the password encrypted using the first password key based on a password key corresponding to a last known mathematical kernel; and comparing the decrypted password to a password stored at the RFID tag.

* * * * *